(12) United States Patent
Rank et al.

(10) Patent No.: US 8,892,514 B2
(45) Date of Patent: Nov. 18, 2014

(54) MULTI-PATH REPLICATION IN DATABASES (75) Inventors: Christopher Hugh Rank, Longmont, CO (US); Martin Stanley Pieczonka, Gold Canyon, AZ (US); Shuying Yu, Shanghai (CN); Rene Eduard Alexander Quakkelaar, Ter Aar (NL); Elena Isabel Lora Gallardo, Montrouge (FR)

(73) Assignee: Sybase, Inc., Dublin, CA (US)

( * ) Notice: Subject to any disclaimer, the term of this patent is extended or adjusted under 35 U.S.C. 154(b) by 244 days.

(21) Appl. No.: 13/618,785

(22) Filed: Sep. 14, 2012

(65) Prior Publication Data

US 2013/0124464 A1 May 16, 2013

Related U.S. Application Data

(60) Provisional application No. 61/559,845, filed on Nov. 15, 2011.

(51) Int. Cl.
*G06G 7/00* (2006.01)
*G06F 17/00* (2006.01)
*G06F 17/30* (2006.01)
(52) U.S. Cl.
CPC .................. *G06F 17/30575* (2013.01)
USPC ........................................................ 707/615

(58) Field of Classification Search
None
See application file for complete search history.

(56) References Cited

U.S. PATENT DOCUMENTS

2010/0332448 A1* 12/2010 Holenstein et al. ........... 707/615

* cited by examiner

*Primary Examiner* — Jason Liao
(74) *Attorney, Agent, or Firm* — Sterne, Kessler, Goldstein & Fox P.L.L.C.

(57) ABSTRACT

Systems, methods and computer program products for multi-path replication in databases are described herein. A non-limiting embodiment includes instantiating a plurality of replicate connections to a replicate database, providing transactions to the replicate database through a plurality of transaction streams, where the transaction streams associated with respective instantiated replicate connections. Transactions occurring in distinct transaction streams are applied, in parallel, at the replicate database. Another non-limiting embodiment includes instantiating a plurality of replication sender threads, where the replication sender threads communicate in parallel with respective replication servers over respective replication paths. Data sharing one or more attributes can be bound to a replication path in communication with the respective replication servers.

12 Claims, 8 Drawing Sheets

MULTI-PATH REPLICATION IN DATABASES

CROSS-REFERENCE TO RELATED APPLICATIONS

This application claims benefit to U.S. Provisional Patent Application No. 61/559,845, filed on Nov. 15, 2011, the contents of which is incorporated herein by reference in its entirety.

BACKGROUND

1. Field

Embodiments of the present invention generally relate to database systems, and particularly to database replication using multiple replication paths.

2. Background Discussion

Data replication is the process of maintaining multiple copies of a database object in a distributed database system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively become online backup copies if a failure occurs.

Conventional replication architecture supports a single path (or stream) of data between a primary (or source) database and a replication server. Specifically, database transactions are replicated at a target (or replicate) database, serially, in a single replication path, to maintain a transaction commit order at the primary database.

In some instances, however, this replication architecture can prove disadvantageous. For instance, when throughput activity at the primary database is high, the replication server (responsible for replicating transactions at the target database) cannot maintain the low replication latency expected by users at the target database. In other words, time taken to replicate database operations increases significantly as a large number of operations begin to be committed at the primary database.

Thus, as replicated transaction and data volume increases, traditional replication solutions utilizing a single replication path cannot match data generation/transaction speeds at the primary database. This causes both data accumulation and significant transaction latency.

In addition, transactions applied at the primary database can have different replication priorities. Some transactions are expected to be replicated sooner than other transactions at the target database. However, conventional replication techniques are limited to serially replicating transactions in an order that the transactions were committed in at the primary database. Accordingly, systems and method for replicating data that maintain low replication latency during periods of high throughput activity at the primary database and that have the ability to prioritize transactions are needed.

BRIEF SUMMARY

Briefly stated, embodiments of the invention include system, method, computer program product embodiments, and combinations and sub-combinations thereof, for multi-path database replication.

A non-limiting embodiment includes instantiating a plurality of replicate connections to a replicate database, providing transactions to the replicate database through a plurality of transaction streams, where the transaction streams are associated with respective instantiated replicate connections. Transactions occurring in distinct transaction streams can be applied, in parallel, at the replicate database.

The embodiment further includes instantiating a plurality of connections to replication agent threads associated with a primary database and selectively assigning a replication path to a transaction based on the transaction's replication priority. The embodiment further includes identifying a path with less transaction congestion compared to transaction congestion in other replication paths and assigning a replication transaction with high replication priority to the identified path.

Another non-limiting embodiment includes instantiating a plurality of replication sender threads, where the replication sender threads communicate in parallel with respective replication servers over respective replication paths. Data sharing one or more attributes is bound to a distinct replication path in communication with the respective replication servers.

In this way, embodiments improve replication performance and quality of service, regardless of replicated transaction volume at a primary database, by resolving transactions into a plurality of transaction streams. The transactions can be applied at a replicate database in parallel or in any order of transaction priority.

Furthermore, embodiments can bind database objects to replication channels, so that a replication server in control of a channel can receive data bound to the channel. In other words, data can be filtered from other data by binding the data to a channel assigned to a replication server before it is delivered to the replication server. In this way, replication transaction load can be distributed across a plurality of replication servers so that each replication server can provide improved replication performance.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements.

DETAILED DESCRIPTION

Embodiments of the present invention relate to systems, methods and computer program products for multi-path replication.

While embodiments of the present invention are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

As used herein, the term "commit order" (or transaction serialization) refers to an order of transactions applied at a primary database. As noted above, conventional replication approaches maintain a commit order of transactions that occur at the primary database.

As used herein, the term "transaction integrity" refers to a set of row modifications captured at a primary database for replication in accordance with business (or replication) rules. For example, not intended to be limiting, transaction integrity may be violated if different row modifications to different tables within transactions were delivered by different replicate connections.

As used herein, the term "parallelizable transactions" refers to transactions that may be replicated without regard to a primary transaction commit serialization order, and yet maintain database consistency when the transactions are applied according to parallelization rules.

As used herein, the term "parallelization rules" refers to transaction attributes or data values that can be used to segregate parallelizable transactions. Examples of transaction attributes include, but are not limited to, an origin session ID, an origin user, a set of origin tables, an origin transaction name, etc.

With reference to the term "replication priority," and as a non-limiting example, if transaction A is expected to be replicated at a replicate database with a smaller latency than another transaction B, transaction A can be considered to have a higher replication priority than transaction B. Also for example, transactions A & B can be parallelizable transactions to maintain database consistency.

As used herein, the term "primary connection" refers to instances of components including, but not limited to, an executor (EXEC) module, inbound queue and distributor module. As a non-limiting example, a replication server may set up a primary connection for each primary/active database. Also, for example, a primary connection name may be identical to a database name.

As used herein, the term "replicate connection" refers to instances of components including, but not limited to, an outbound queue, a data-server interface (DSI) scheduler thread and a DSI execute thread. As an example, a replication server may instantiate a replicate connection for each replicate database and also instantiate a replicate connection without an outbound queue for a standby database. Also, for example, a replicate connection name may be identical to a replicate/standby database name.

As used herein, the term "replication path" references transactions from a primary database that are replicated to a replicate database through components of a replication system. These components may include, but are not limited to, a replication agent module or thread, an EXEC module, an inbound queue, a distributor (DIST) module, route, outbound queue and a DSI module. In a standby environment, transactions from an active database are replicated to the standby database through components including, but are not limited to, a replication agent module, an EXEC module, an inbound queue and a DSI module. As a non-limiting example, a set of replication instances including such components can be considered to be a replication path.

Furthermore, a "path" can be considered to be an example of a named channel over which data is transported from a database to a replication server. In a non-limiting embodiment, a replication agent thread can resolve a "path" into at least two parts, i.e., a logical path and a physical path (discussed below).

As used herein, the term replication server ("RS") definition includes, but is not limited to, connectivity and configuration information to connect a replication agent thread (RAT) sender to a given replication server.

As used herein, the term "scanner" refers to a task that can be responsible for reading a transaction log for records for replication, and routing these records to an appropriate sender (e.g., RAT sender).

As used herein, the term "sender" refers to a thread (that can be controlled by the scanner) that can connect to a specified replication server to exchange replication data.

As used herein, a "bind" operation can be used to create an association between a database object and a "path."

As used herein, a "physical path" defines a replication server that is to receive data bound to the path along with one or more characteristics of the path. In a non-limiting embodiment, a "physical path" encapsulates how senders are to connect to a replication server. A physical path can also hold a RS definition and additional multi-path replication information.

As used herein, "logical paths" can be used to group one or more physical paths under a single name to facilitate association of replicate data when the replicate data is to be distributed to multiple targets. For example, a dimension table may need to be replicated to all available destinations in a replication environment. Instead of requiring users to bind each dimension table to each respective destination, a single operation may be needed for each replicated object, according to a non-limiting example.

In general, and as a non-limiting example, a logical path represents a 1:N relationship with available physical paths where N=1–(a number of physical paths). In a non-limiting embodiment, a logical path created when a physical path is initially defined is closely coupled to an underlying physical path and thus can allow users a handle to modify associated configuration, if necessary. Other logical paths are considered "strict," and are loosely coupled to an underlying physical path and can be used to give users a convenient means of routing data to sets of destinations. In an embodiment, logical paths, strict or otherwise, are targets to which database objects can be bound.

As used herein, "DSP" refers to a dataserver interface thread. As a non-limiting example, a DSI reads transactions from a queue and applies the transactions to a replicate database.

As used herein, "DIST" refers to a distributor thread. As a non-limiting example, each primary connection can have a DIST thread. A DIST may determine a replicate database to which transactions from the primary database are to be distributed in accordance with replication definitions and subscriptions defined in a replication server.

As used herein, "EXEC" refers to an executor thread. An executor thread can handle incoming connections from a replication agent and place transactions sent by the replication agent into stable queues.

The example definitions discussed above are purely illustrative and are not intended to limit the embodiments.

Figure 1:
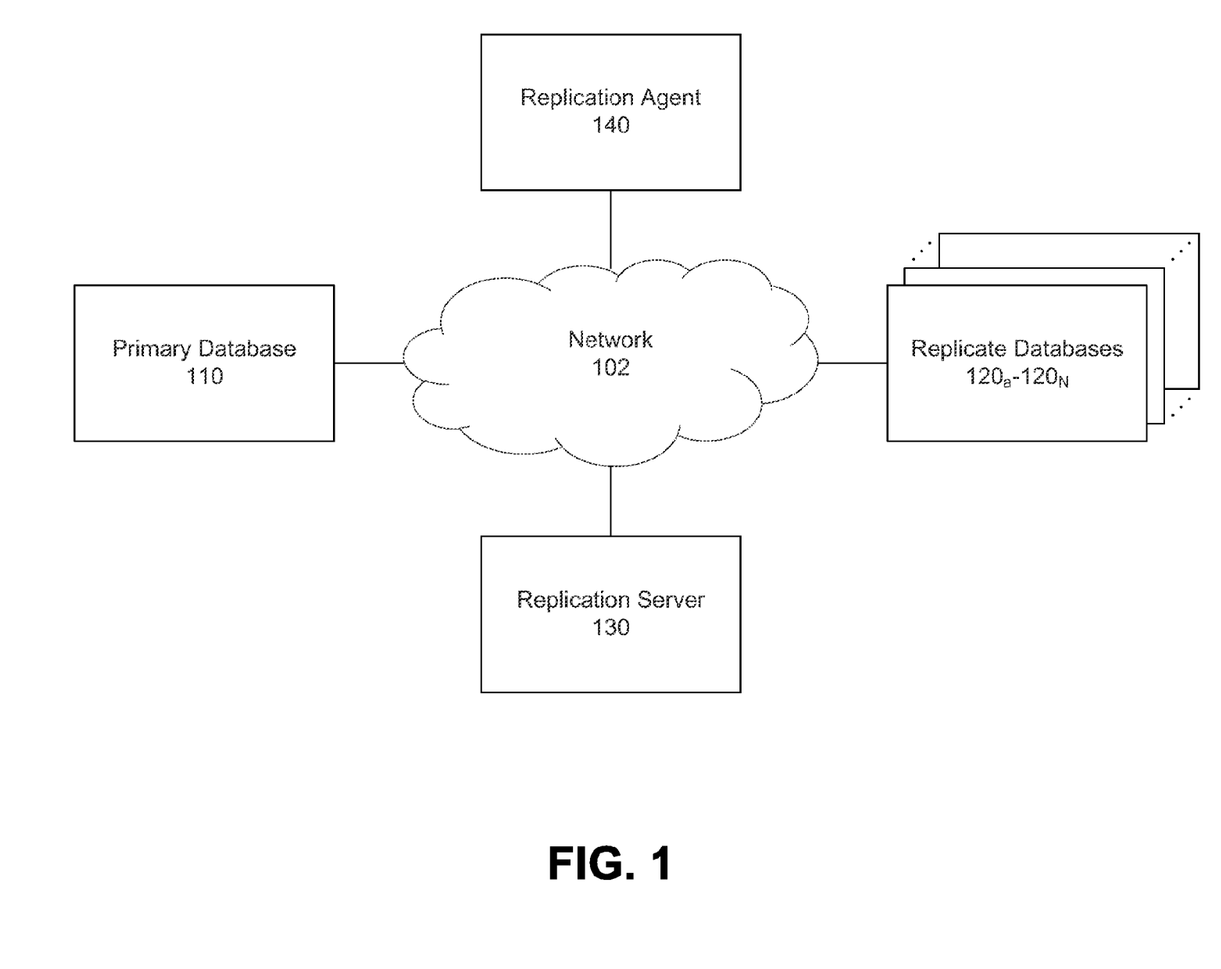
FIG. 1 is a diagram of an example replication environment.

This section describes an exemplary replication environment, according to an embodiment of the invention illustrated in FIG. 1.

FIG. 1 includes primary database 110, replication agent 140, replication server 130, replicate databases 120a-120N and network 102. The invention is applicable to any system having generally the structure of FIG. 1, or that would benefit from the operation, methods and functions as described herein. FIG. 1 is purely illustrative and is not intended to limit the invention.

Primary database 110 may be any form of database and can include, but is not limited to, a device having one or more processors and memory for executing and storing instructions. Such a database may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

In an embodiment, primary database 110 is a source of transactions that manipulate and/or modify data in replicate databases $120_a$-$120_N$. Tables marked for replication in a primary database 110 may be known as marked tables (not shown). In an embodiment, a primary table is marked for replication (e.g., marked by a database administrator) so that replication agent 140 can identify and replicate transactions that affect the data in the table using replication server 130.

Replication agent 140 can capture replicated transactions (i.e., transactions occurring on marked tables) in primary database 110, and then may send those transactions to replication server 130 for distribution to replicate databases $120_a$-$120_N$. In an embodiment, replication agent 140 provides a transaction log of one or more transactions at primary database 110 to replication server 130. In an embodiment, replication agent 140 instantiates one or more replication agent threads in primary database 110 or any other components of system 100. A replication agent thread, according to an embodiment, is discussed further below.

In an embodiment, replication agent 140 runs as a stand-alone application, independent of primary database 110, replication server 130, and any other replication system component. In another embodiment, replication agent 140 may reside on the same host machine as, for example, primary database 110 or any other replication system component.

Replication server 130 can receive, from replication agent 140, transactions that are to be replicated at replicate databases $120_a$-$120_N$. In an embodiment, replication server 130 may send replicated transactions to replicate databases $120_a$-$120_N$ in response to one or more commands from replication agent 140. In an embodiment, replicate databases $120_a$-$120_N$ each include one or more replicated tables (not shown) that correspond to one or more marked tables at primary database 110. When replicated transactions are, for example, processed successfully by replicate databases $120_a$-$120_N$, replicated tables in replicate databases $120_a$-$120_N$ are synchronized with corresponding marked tables in primary database 110.

Network 102 can be any type of network or combination of networks such as, but not limited to, a local area network, wide area network or the Internet. Network 102 can be a form of a wired network or a wireless network, or a combination thereof. Network 102 can allow primary database 110, replication server 130, replication agent 140, replicate databases $120_a$-$120_N$ and any other networked components to communicate with each other.

Components of system 100 (i.e., replication agent 140, primary database 110, replication server 130 and replicate databases $120_a$-$120_N$) can be computing devices including one or more processors and may further include one or more modules implemented using one or more processors. Components of system 100 can include any form of physical storage such as hard-disk drives, flash drives, random access memory (RAM), and any computer-readable or computer-useable storage media that may be configured to store/execute instructions and data. An example computer useful for implementing components of the embodiments is described further below.

Multiple Data-Server Interfaces (DSI)

Figure 2A:
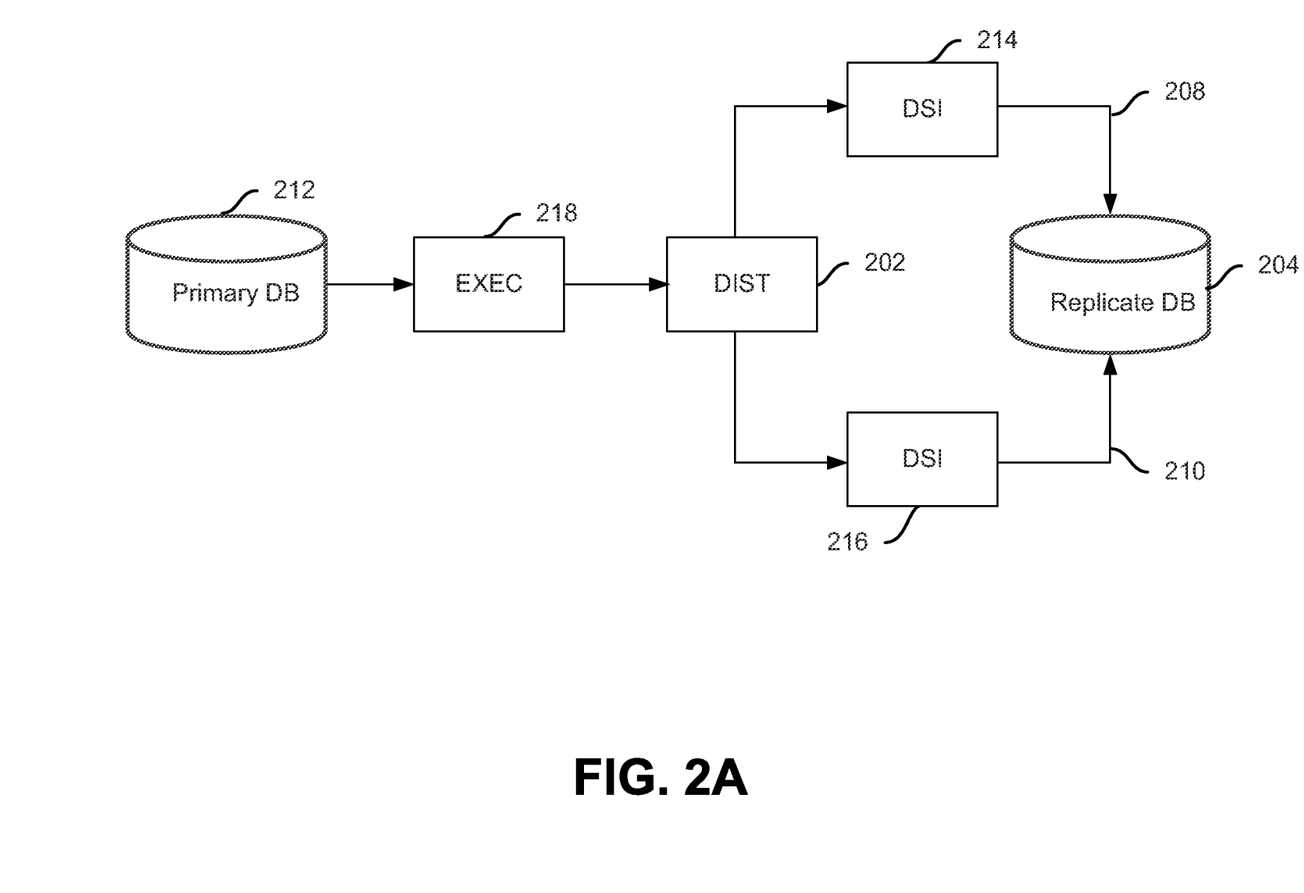
FIG. 2A is a diagram of a multi-path replication environment, according to an embodiment.

FIG. 2A illustrates an example system for multi-path replication, according to an embodiment.

Referring to FIG. 2A, embodiments instantiate and maintain a plurality of replicate connections to replicate database 204. In an embodiment, distributor module (DIST) 202 resolves transactions received from execution module (EXEC) 218 (and addressed to replicate database 204) into streams 208 and 210 in accordance with replication subscriptions. FIG. 2A also illustrates data-server interface (DSI) 214 and DSI 216 associated with respective streams 208 and 210.

In a non-limiting embodiment, each replicate connection can handle a transaction stream. In a non-limiting embodiment, transactions in the same stream may conform to the transactions' commit order at primary database 212. Furthermore, in an embodiment transactions in different streams (e.g., streams 208 and 210) are applied in parallel and in an order potentially different from their commit order at primary database 212.

Example Multiple DSI User Commands

In a non-limiting embodiment, users may create a default replicate connection to a replicate database by 'create connection' and 'create connection . . . using profile' commands.

As a non-limiting example, in order to create alternate replicate connections to a replicate database, users may use commands including, but not limited to:

create alternate connection to ds_name.db_name
named conn_server.conn_db
[set error class [to] error_class
set function string class [to] function_class
set username [to] user
set password [to] pwd]
[set param[to] 'value']

EXAMPLE 1

The example commands noted in Example 1 create an alternate (or parallel) replicate connection to a replicate database 'ds_name.db_name'. The name of the alternate replicate connection is 'conn_server.conn_db'.

'ds_name.db_name' is the name of the replicate database. As an example, the replicate database may not be a standby database of a warm standby database.

'conn_server.conn_db' is used as a name of the alternate replicate connection.

In a non-limiting embodiment, there may be some constraints on an alternate replicate connection name. For example, a. If 'conn_server' is different from 'ds_name', an interface entry for 'conn_server' may exist in the interface file.

b. If 'conn_server' is identical to 'ds_name', 'conn_db' may be different from 'db_name'.

c. Every replicate connection name can be unique in a replication system.

These examples are purely illustrative and are not intended to limit the embodiments.

Referring to Example 1, users may set '[set error class . . . set password to pwd]' configurations for an alternate replicate connection. In a non-limiting embodiment, if 'set' clauses are omitted, the alternate replicate connection may inherit these configurations from a default replicate connection. If there is no default replicate connection, users may be required to set these configurations.

In an embodiment, these configurations may only be inherited when there is a route from the controller of the default connection to the controller of the alternate connection or when they are controlled by the same replication server.

In a non-limiting embodiment, if a maintenance user for the alternate connection is not set, the alternate connection can use the maintenance user of the default connection. If a new maintenance user is set, the alternate connection will proceed to use the new maintenance user.

Referring to Example 1, '[set param [to] 'values']' connection configuration may be optional. In an embodiment, the specified value for these parameters can override an inherited value or a default value. In an embodiment, these configurations may be inherited when the default connection and the alternate connection are controlled by the same replication server.

Embodiments can support creation of multiple replicate connections to a database from multiple replication servers in a common replication domain. In an embodiment, each replicate connection may have a unique name. In a non-limiting embodiment, one replication server may control default replicate connections. Other replication servers may control alternate (or parallel) replicate connections.

In an embodiment, after an alternate replicate connection is created, embodiments can:

Configure the alternate replicate connection by using 'alter connection' command.

Create a subscription using 'create subscription' at the alternate replicate connection.

In an embodiment, an alternate replicate connection can have a row for each source in table 'rs_lastcommit' for duplication detection.

Referring to Example 1, and in an embodiment, 'drop connection to ds_name.db_name' can support alternate replicate connections.

In an embodiment, 'ds_name.db_name' can be a default replicate connection or an alternate replicate connection.

In an embodiment, when a default connection is dropped, alternate connections controlled by the default connection's replication server may also be dropped.

In an embodiment, 'alter connection to ds_name.db_name' can support alternate replicate connections.

In an embodiment 'ds_name.db_name' can be a default replicate connection or an alternate replicate connection.

The following example commands in Example 2 can be used to move subscriptions between multiple DSI.

alter subscription sub_name
for {table_repdef|func_repdef|{publication publ
database replication definition db_repdef}
with primary at ds_name.db_name}
move replicate from ds_name.db_name
to ds_name.db_name

EXAMPLE 2

In an embodiment, the command(s) noted above move transactions subscribed by a subscription between multiple replicate connections. With this command(s), embodiments can move subscriptions from one replicate connection to another replicate connection without re-materialization.

In an embodiment, the above command(s) can be issued on a replicate replication server. In an embodiment, to move multiple subscriptions at the same time, log transfer for primary connections may first be suspended and then resumed after necessary subscriptions are moved.

In a non-limiting embodiment, a subscription may be moved between replicate connections controlled by an identical replication server.

In a non-limiting embodiment, the 'admin show_connections[, replicate]' command can be used to display a connection name, a replicate database, user and state of all replicate connections.

In an embodiment, 'rs_databases' is a database table that can store connection information known at a replication server site. With multiple connections, each connection can have a corresponding row in system table 'rs_databases'. A new column is added to store an ID of a connection.

In an embodiment, 'rs_lastcommit' is a database table storing information used by a replication server to find a last transaction committed from each data source. In an embodiment, every original database may have one row in table 'rs_lastcommit'. In an embodiment, multiple replicate connections apply transactions from an identical original database in parallel.

In an embodiment, each replicate connection stores a OQID of a last committed transaction in 'rs_lastcommit' table. Thus, every replicate connection can utilize one row in 'rs_lastcommit' table. Accordingly, column 'conn_id' is added to the 'rs_lastcommit' table to identify a replicate connection using a particular row. In an embodiment, a replicate connection uses a row in which 'conn_id' equals the replicate connection's connection id.

In an embodiment, 'rs_threads' is a database table storing information used by a replication server to detect deadlocks and to perform transaction serialization between parallel DSI threads. In an embodiment, replicate connections of multiple DSI threads may need to check table entries entered by themselves. Thus, column 'conn_id' is added to identify a replicate connection presently using a row. In a non-limiting embodiment, every replicate connection may use a row in which 'conn_id' equals the replicate connection's connection id.

In an embodiment, 'rs_ticket_history' stores 'rs_ticket' information. Embodiments may store store 'rs_ticket' information from each replicate connection. Thus, column 'conn_id' is added to identify which replicate connection is using the row. In a non-limiting embodiment, every replicate connection may use a row in which 'conn_id' equals the replicate connection's connection id.

Supporting Multiple Replication Agents

As noted earlier, conventional replication architecture supports a single path (or stream) of data between a primary (or source) database and a replication server. Specifically, in conventional approaches, database transactions are replicated at a target (or replicate) database, serially, in a single replication path to maintain a transaction commit order at the primary database. However, this replication architecture is disadvantageous because when throughput activity at the primary database is high, the replication server, which replicates transactions at the target database, cannot maintain a low replication latency expected by users at the target database. This causes both data accumulation and significant transaction latency.

In contrast to conventional approaches, embodiments of the invention enable a replication server to support a plurality of incoming replication agent connections from a primary database. In an embodiment, to support multiple replication agent threads/connections, the replication server provides a plurality of primary connections for the primary database and binds a primary connection with each replication agent connection.

Figure 2B:
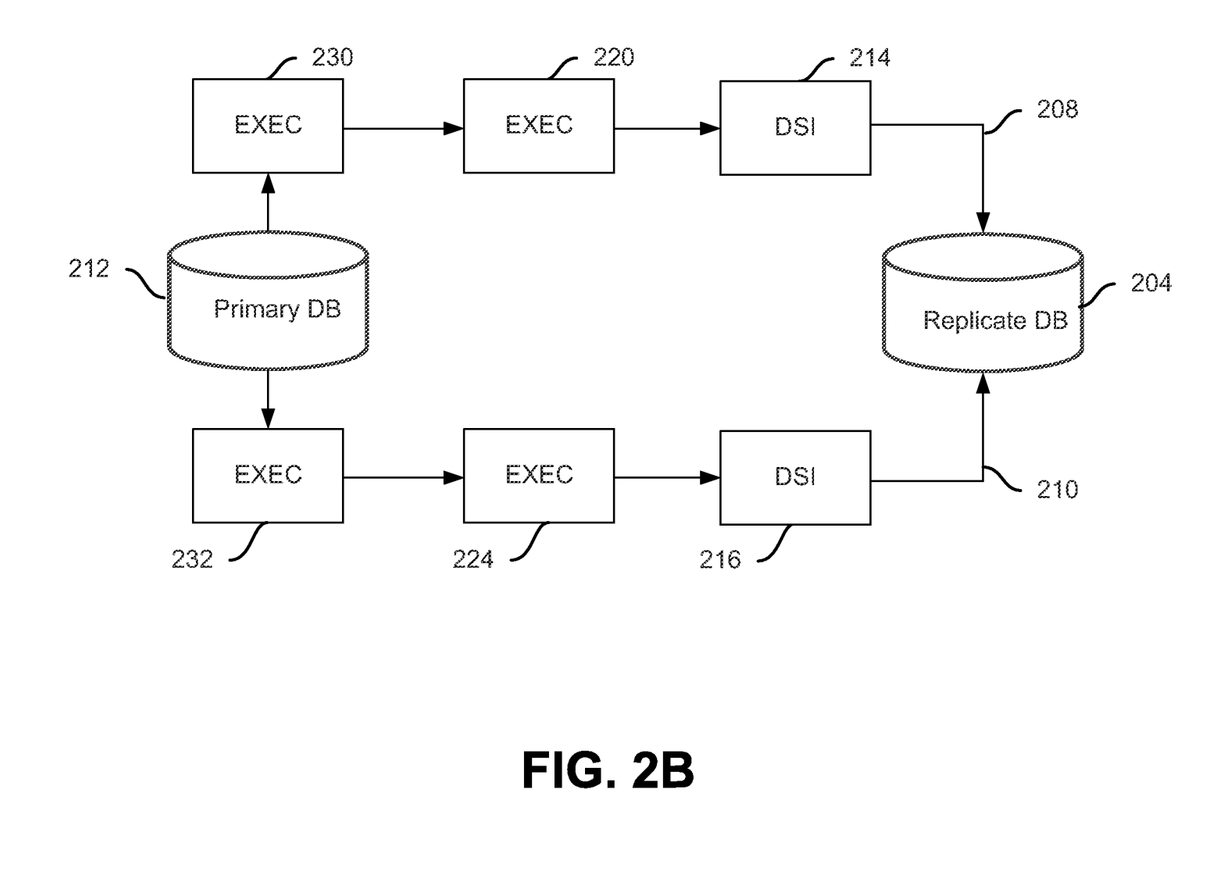
FIG. 2B is a diagram of a multi-path replication environment, according to another embodiment.

Referring to FIG. 2B, embodiments instantiate and maintain multiple replicate connections (e.g., 208 and 210) to replicate database 204. In an embodiment, DIST modules 220 and 224 resolve transactions for replicate database 204 into streams 208 and 210 in accordance with replication subscriptions. FIG. 2B also includes EXEC modules 230 and 232 corresponding to respective DIST modules 220 and 224.

In this way, with multiple DSI modules and supporting multiple replication agent threads through multiple DIST modules, embodiments of the invention provide end-to-end multi-path replication.

In an embodiment, a replicate connection for a replicate database and a primary connection for a primary database can be bound together to create an integrated replication path including replication definition and subscriptions.

In an embodiment, a replicate connection for a standby database and a primary connection for an active database can be bound together as a warm standby replication path by logical connection.

Multi-Site Availability (MSA) Multi-Path Replication

In a non-limiting embodiment, one or more of the following example actions can be performed to setup at least two replication paths between a primary database and a replicate database. These actions can include, but are not limited to:
  Dividing transactions into at least two sets and ensuring transactions in the two sets are parallelizable.
  Creating a default primary connection to the primary database and creating a default replicate connection to the replicate database.
  Creating an alternate primary connection to the primary database and creating an alternate replicate connection to the replicate database.
  Configuring a replication agent to enable at least two senders and bind transactions to the two senders.
  Creating a replication definition against a primary database.
  Creating a subscription against a primary connection and a replicate connection.

Warm Standby Multi-Path Replication

In a non-limiting embodiment, one or more of the following example actions can be performed to setup at least two replication paths between an active database and a standby database. These actions include, but are not limited to:
  Dividing transactions into two sets and ensuring transactions in the two sets are parallelizable.
  Configuring replication agents at both an active database and a replicate database to enable at least two replication agent sender threads, and binding transactions to the at least two sender threads.
  Creating a logical connection.
  Using rs_init to add an active database and a standby database.
  Creating an alternate logical connection.
  Creating an alternate active connection for the alternate logical connection.

Multiple Routes

As a purely illustrative and non-limiting example, consider that there exist a plurality of primary connections to a primary database in a primary replication server and a plurality of replicate connections to a replicate database in a replicate replication server. Because these connections share a route between the primary replication server and the replicate replication server, it is possible that the route between the primary replication server and the replicate replication server becomes congested including multiple replication paths.

To avoid such potential congestion when multiple paths exist, embodiments can instantiate and maintain a plurality of shared routes between the primary replication server and the replicate replication server.

In addition, embodiments can identify a path with less transaction congestion compared to transaction congestion in other replication paths and assign a replication transaction with high replication priority to the identified path, where the identified path may act as a dedicated path for the transaction with high replication priority and any other high priority transactions.

Embodiments instantiate a plurality of replication agent sender threads, where each replication agent sender thread can communicate with a distinct replication server. Embodiments can also associate a set of data to a replication agent out-stream or replication path.

In an embodiment, data can be associated to a path based on one or more parameters/attributes, including, but not limited to:
  Table: Enables association of DML operations performed on a table to a replication path.
  Login: Transactions performed by a login name.
  Server process identifier (SPID)
  Application name: As a non-limiting example, one or more transactions performed by an application may be bound to replication path. In an embodiment, this may require a change in a begin transaction log record to store application name information.

In an embodiment, multiple replication streams can also be assigned to a replication server. In a non-limiting embodiment, tables and stored procedures can be associated (or 'bound') to a replication path so that any replicated data associated with the tables and stored procedures follows that path.

Embodiments also enable:
  Binding by login name: In an embodiment, a login name can be used for binding paths as it is recorded in a begin transaction log record. While a user ID (UID) can be recorded as well, the UID may change by the time a replication agent reads the log record.
  Binding by SPID: In an embodiment, all transactions performed by an SPID can use an identical replication path.
  Binding by category: In an embodiment, DML operations are filtered based on content of a column (e.g., "where state='CA'").

Embodiments also provide support for a plurality of replication agent scanners and a plurality of logical truncation points.

Embodiments enable a replication administrator to define a plurality of replicate destinations from a given source database so that replicated data can be delivered to different and multiple destinations.

Figure 3:
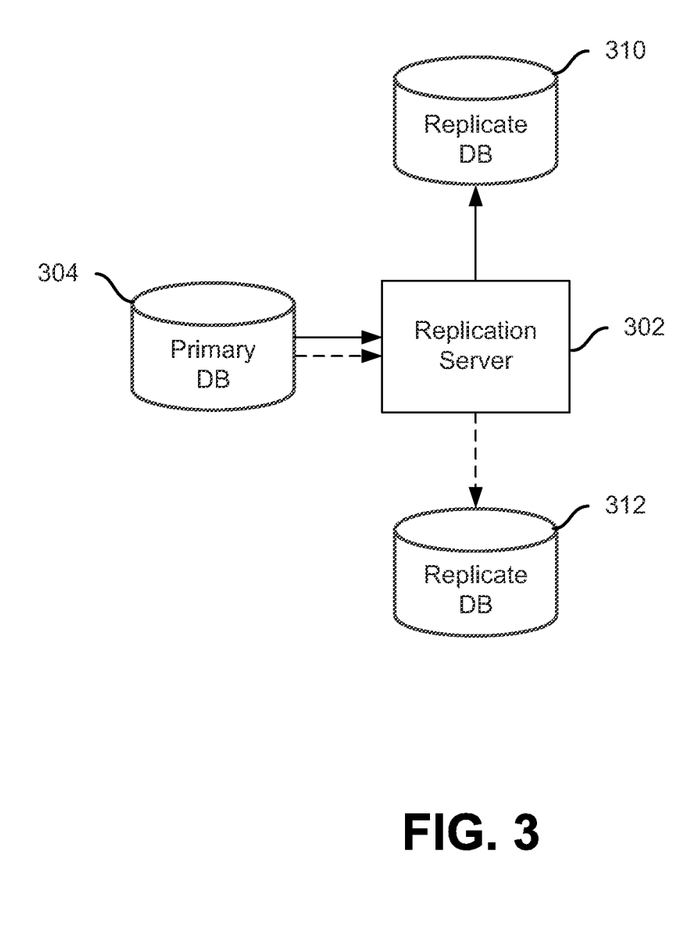
FIG. 3 illustrates a conventional replication environment.

Conventionally, as shown in FIG. 3, replication server 302 receives all data (e.g., data 306 and 308) from source (or primary) database 304. Replication server 302 then conventionally performs data filtering and delivers filtered data to different destinations, i.e., replicate databases 310 and 312.

For instance, the replication server 302 delivers data 306 to replicate database 310 and data 308 to replicate database 312.

Figure 4:
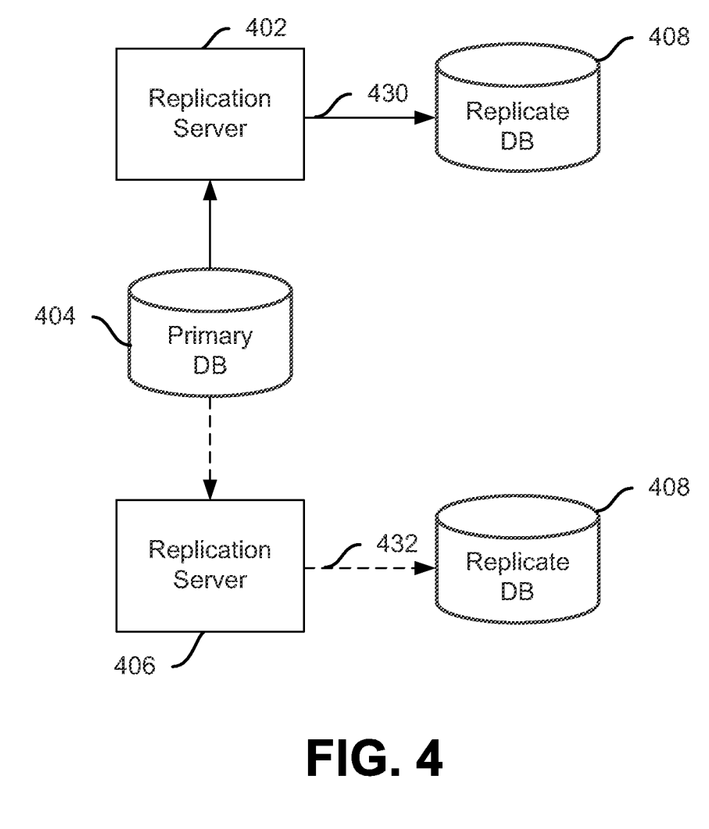
FIG. 4 illustrates a multi-path replication environment enabling binding of objects to replication channels, according to an embodiment.

In contrast to conventional approaches, and with reference to FIG. 4, embodiments of the invention bind a database object to a channel for replication and provide the bound object over the channel to a replication server dedicated to said channel.

For example, a channel 430 is controlled by replication server 402 to deliver data to replicate database 406. Also, channel 432 is controlled by replication server 404 to deliver data to replicate database 408. In this way, data filtering is accomplished at an early stage, i.e., a replication agent delivers data to a replication server in charge of a channel. Because, a replication server in charge of a channel (or path) may only receive data the replication server needs to deliver to the server's known destinations, replication transaction load can be distributed across a plurality of replication servers so that each replication server can provide improved replication performance.

Binding Objects to Replication Paths

In an embodiment, when an object is bound to a path or a set of paths, data manipulation language (DML) and data definition language (DDL) operations done on the object will be distributed to path(s) associated with the object.

For example, if a table or stored procedure is marked for replication, but has not yet been bound to a path, replication operations may be assigned to a default path.

In an embodiment, the 'bind' command creates an association between a named object and a given replication path.

| Parameter | Example Usage |
| --- | --- |
| Action | 'bind' |
| P1 | Object_type - for first release valid object types are: table\|sproc |
| P2 | Object |
| P3 | Logical path name |
| P4 | Unused |

In a non-limiting embodiment, parameter "P2, Object" can at least accept the following formats:
ownername.objectname, and
objectname In an embodiment, the "sp_replication_path" stored procedure may support a pattern matching capability (e.g., wildcards) for names of objects to be bound (or unbound) to a path.

As a non-limiting example, there can be two characters interchangeably recognized as wildcards, i.e., either the percent "%" sign or the asterisk '*' sign may be used to indicate zero or more matching characters.

Example Binding 1: Bind the table object 't1' to the new replication path pbd_2
Example Command for Binding 1:
sp_replication_path<dbname>, 'bind', "table", "t1", "pdb_2"

Example Binding 2: Bind the table object 't1' belonging to 'owner1' to the new replication path pbd_2
Example Command for Binding 2:
sp_replication_path<dbname>, 'bind', "table", "owner1.t1", "pdb_2"

Example Binding 3: Bind the stored procedure object 'sproc1' to the new replication path pbd_2:
Example Command for Binding 3:
sp_replication_path<dbname>, 'bind', "sproc", "sproc1", "pdb_2"

Example Binding 4: Bind the dimension table object 'dt1' to 'everywhere' path:
Example Command for Binding 4:
sp_replication_path<dbname>, 'bind', "table", "dt1", "everywhere"

Example commands to match a table name 'authors' to any of the following wildcard patterns:
sp_replication_path 'dbname', 'bind', 'table', 'a*'
sp_replication_path 'dbname', 'bind', 'table', 'au%rs'
sp_replication_path 'dbname', 'bind', 'table', 'a*th%s'
sp_replication_path 'dbname', 'bind', 'table', 'authors%'

Embodiments can also enable binding by login or session, e.g., sp_replication_path <dbname>, 'bind', 'session'

Figure 5:
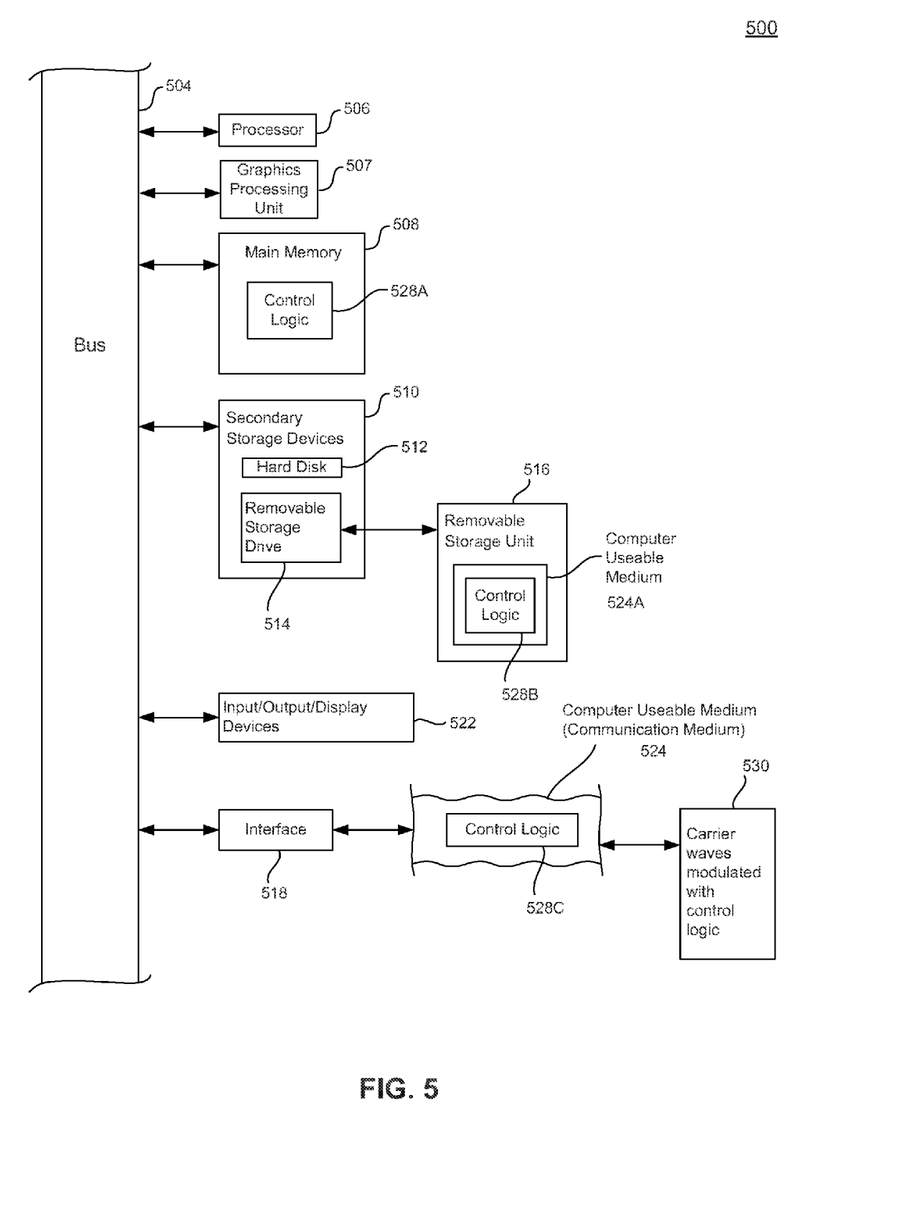
FIG. 5 illustrates an example computer useful for implementing components of the embodiments.

In an embodiment of the present invention, the system and components of embodiments described herein are implemented using well known computers, such as computer 502 shown in FIG. 5. For example, replication server 130, replication agent 150, primary database 110, replicate databases 120a-120N, and any modules (e.g., EXEC, DSI, DIST) can be implemented using computer (s) 502.

The computer 502 can be any commercially available and well known computer capable of performing the functions described herein, such as computers available from International Business Machines, Apple, Sun, HP, Dell, Compaq, Cray, etc.

The computer 502 includes one or more processors (also called central processing units, or CPUs), such as a processor 506. The processor 506 is connected to a communication infrastructure 504.

The computer 502 also includes a main or primary memory 508, such as random access memory (RAM). The primary memory 508 has stored therein control logic 528A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524A having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well-known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer useable or readable medium), such as LANs, WANs, the Internet, etc. The network interface 518 may interface with remote sites or networks via wired or wireless connections.

Control logic 528C may be transmitted to and from the computer 502 via the communication medium 524B.

Any apparatus or manufacture comprising a computer useable or readable medium having control logic (software) stored therein is referred to herein as a computer program product or program storage device. This includes, but is not limited to, the computer 502, the main memory 508, secondary storage devices 510 and removable storage unit 516. Such computer program products, having control logic stored therein that, when executed by one or more data processing devices cause such data processing devices to operate as described herein, represent embodiments of the invention.

The invention can work with software, hardware, and/or operating system implementations other than those described herein. Any software, hardware, and operating system implementations suitable for performing the functions described herein can be used.

Figure 6:
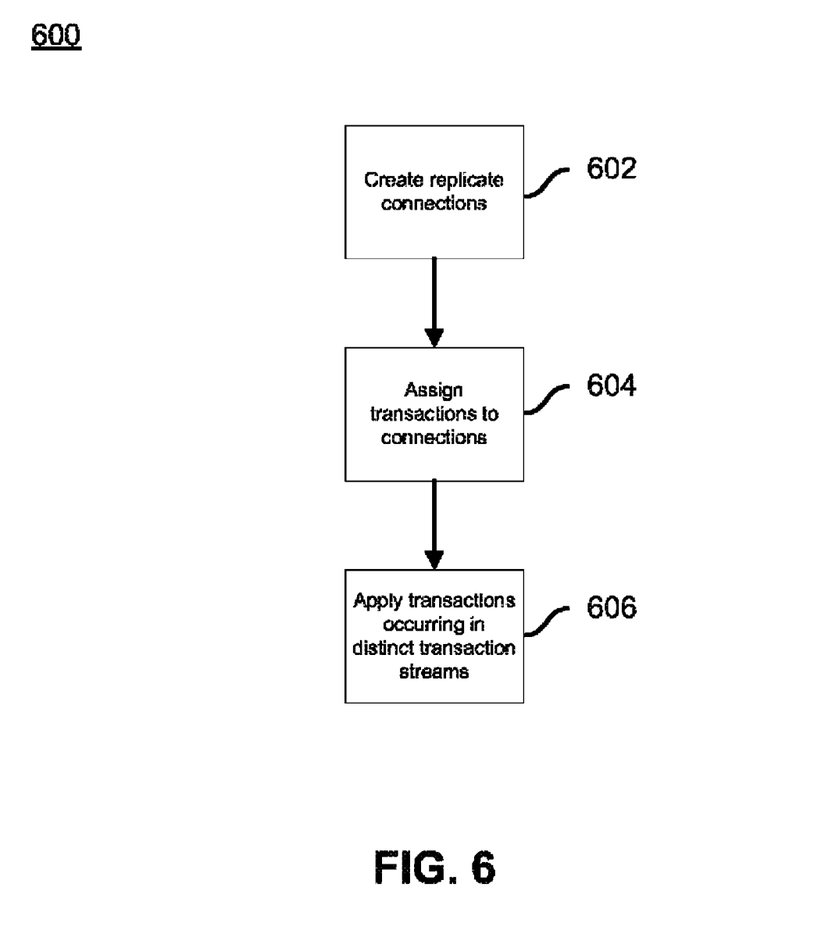
FIG. 6 is a flowchart illustrating a method of replicating data according to embodiments of the invention.

FIG. 6 is a flowchart that depicts a method 600 of replicating data according to embodiments of the invention. According to the method, a number of replicate connections are created at step 602. Next, transactions are assigned to the various connections at step 604. The assignment of transactions can occur a number of different ways according to the various embodiments. For instance, according to some embodiments, the transactions are selectively assigned to a replication path based on a replication priority. Accordingly to various embodiments, higher priority transactions might be assigned to a path having less congestion and lower priorities might be assigned to paths having more congestion.

At step 606, transactions are applied in parallel to the replicate databases in distinct transaction streams. According to some embodiments, the transactions may be applied in an order different from their commit order at the primary database. However, according to some embodiments, transactions applied to the same transaction stream can be applied in the same order as dictated by their primary database commit order.

Figure 7:
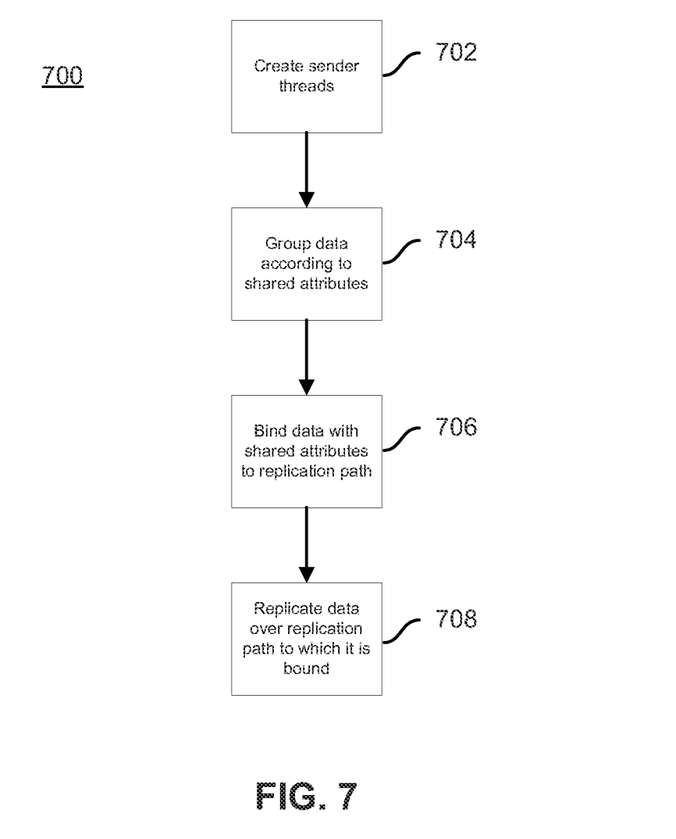
FIG. 7 is a flowchart illustrating a method of replicating data according to embodiments of the invention.

FIG. 7 is a flowchart illustrating a method 700 of replicating data according to embodiments of the present invention. According to the method, at step 702, a plurality of replication sender threads can be created. The replication sender threads can communicate in parallel with one or more respective replication servers over one or more replication paths. At step 704, data with shared attributes can be grouped according to those shared attributes. According to various embodiments shared attributes may include, for instance, an object type, a table name, an identifier, a statement category, or a user, to name a few.

At step 708, the method binds data with shared attributes to a particular replication path that communicates with one of the replication servers. For instance, data having the same object type might be bound to the same replication path at this step. At step 708, the data sharing distinct attributes can be replicated over respective data paths in parallel.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for database replication, comprising:
   instantiating a plurality of replicate connections to a replicate database;
   providing transactions to said replicate database through a plurality of transaction streams, said transaction streams associated with respective instantiated replicate connections; and
   applying, in parallel at said replicate database, transactions occurring in distinct transaction streams in a commit order different from said transactions' commit order at a primary database.

2. The method of claim 1, further comprising:
   applying transactions sharing a transaction stream in a primary database commit order.

3. The method of claim 1, wherein said providing is performed in accordance with one or more replication subscriptions.

4. The method of claim 1, further comprising:
   instantiating a plurality of connections to replication agent threads associated with a primary database.

5. The method of claim 1, further comprising:
   selectively assigning a replication path to a transaction based on said transaction's replication priority.

6. The method of claim 5, further comprising:
   identifying a replication path with less transaction congestion compared to transaction congestion in other replication paths; and
   assigning a replication transaction with high replication priority to said identified replication path.

7. The method of claim 1, further comprising:
   dynamically distributing data to one or more replication connections based on one or more configurable parallelization rules.

8. A processor-based system for database replication, comprising:
   a replicate database; and
   a primary database comprising a processor and a memory, wherein said memory contains computer program instructions configured to be executed by said processor, and wherein the computer program instructions comprise:
   a first module configured to instantiate a plurality of replicate connections to said replicate database;
   a second module configured to provide transactions to said replicate database through a plurality of transaction streams, said transaction streams associated with respective said replicate connections; and
   a third module configured to apply, in parallel at said replicate database, transactions occurring in distinct transaction streams in a commit order different from said transactions' commit order at said primary database.

9. The system of claim 8, further comprising:
a fourth module configured to apply transactions in distinct transaction streams, at said replicate database, in a commit order distinct from said transactions' commit order at a primary database.

10. The system of claim 8, further comprising:
a fourth module configured to instantiate a plurality of connections to replication agent threads associated with a primary database.

11. The system of claim 8, further comprising:
a fourth module configured to identify a replication path with less transaction congestion compared to transaction congestion in other replication paths; and
a fifth module to assign a replication transaction with high replication priority to said identified replication path.

12. A computer program product including a computer-readable medium having instructions stored thereon that, if executed by a processing device, cause the processing device to perform operations comprising:
instantiating a plurality of replicate connections to a replicate database;
providing transactions to said replicate database through a plurality of transaction streams, said transaction streams associated with respective instantiated replicate connections; and
applying, in parallel at said replicate database, transactions occurring in distinct transaction streams in a commit order different from said transactions' commit order at a primary database.

* * * * *